US005360571A

United States Patent [19]
Kilgour et al.

[11] Patent Number: 5,360,571
[45] Date of Patent: Nov. 1, 1994

[54] SURFACTANT COMPOSITIONS

[75] Inventors: John A. Kilgour, Putnam Valley; George A. Policello, Peekskill, both of N.Y.

[73] Assignee: OSi Specialties, Inc., Danbury, Conn.

[21] Appl. No.: 861,066

[22] Filed: Mar. 31, 1992

[51] Int. Cl.$^5$ .................... C11D 1/04; C07F 7/02; C07F 7/18
[52] U.S. Cl. .................... 252/174.15; 252/174.21; 252/174.23; 528/26; 556/437
[58] Field of Search .................... 252/174.15, 174.21, 252/174.23; 528/26; 556/437

[56] References Cited

U.S. PATENT DOCUMENTS

| | | | |
|---|---|---|---|
| 2,425,755 | 8/1947 | Roberts et al. | 260/615 |
| 2,448,664 | 9/1948 | Fife et al. | 260/615 |
| 3,418,354 | 12/1968 | Wheeler | 260/448.2 |
| 3,507,923 | 4/1970 | Gessner | 268/615 |
| 3,544,617 | 12/1970 | Oga et al. | 260/465 |
| 3,560,544 | 2/1971 | Haluska | 260/448.2 |
| 3,562,786 | 2/1971 | Bailey et al. | 252/137 |
| 3,741,917 | 6/1973 | Morehouse | 260/2.5 AH |
| 4,010,110 | 3/1977 | Cosentino | 252/314 |
| 4,031,044 | 6/1977 | Joslyn | 260/2.5 AH |
| 4,139,546 | 2/1979 | Berger et al. | 260/448.2 |
| 4,256,916 | 3/1981 | Morris et al. | 562/537 |
| 4,395,352 | 7/1983 | Kulkarni et al. | 252/321 |
| 4,462,921 | 7/1984 | Peterson et al. | 252/78.3 |
| 4,658,049 | 4/1987 | Nakano et al. | 556/437 |
| 4,708,807 | 11/1987 | Kemerer | 252/8.6 |
| 4,784,799 | 11/1988 | Petroff | 252/548 |
| 4,990,643 | 2/1991 | Traver | 556/439 |
| 5,063,044 | 11/1991 | Kohl et al. | 424/70 |

FOREIGN PATENT DOCUMENTS 0005488 5/1991 Japan .................... 556/437

OTHER PUBLICATIONS

Molecular Interaction and Synergism in Binary Mixtures of Surfactants Rosen, Milton J. 1986.
Relationship of Structure to Properties in Surfactants Rosen, Milton J. 1974.
Mixed Micelle Solutions Rubingh, Donn N. 1979.
Rosen, M. J., ACS, Symp. Series, vol. 311, p. 144 (1986).
Rosen, M. J., Journal of the American Oil Chemists' Society, vol. 51, pp. 461–465, Oct. 1974.
Rubingh, D. N., Solution Chemistry of Surfactants, K. L. Mittal, Ed., vol. 1, Plenum Press, pp. 337–354 (1979).

Primary Examiner—Paul Lieberman
Assistant Examiner—Michael P. Tierney
Attorney, Agent, or Firm—Andrew S. Reiskind

[57] ABSTRACT

Synergistic surfactant compositions. Polysiloxane-polyoxyalkylene copolymers in which the polyether pendants bear carboxylic acid groups or salts of carboxylic acid groups are demonstrated to have synergystic interactions with anionic and cationic organic surfactants to improve the surface characteristics of a solution, requiring unexpectedly low concentrations to obtain specific surface tension values or to attain critical micelle concentrations in aqueous solutions. Compositions containing an organic surfactant and a polysiloxane-polyoxyalkylene copolymer bearing carboxyl groups are claimed. A method for modifying the surface properties of an aqueous system by employing such compositions as components of the system is also claimed.

8 Claims, 4 Drawing Sheets

LOGS OF CRITICAL MICELLE CONCENTRATIONS FOR MD*1.0M (10% ACRYLIC ACID GRAFT)/ ARQUAD T-50 BLENDS

FIGURE 1
LOGS OF CRITICAL MICELLE CONCENTRATIONS FOR
MD*1.0M (10% ACRYLIC ACID GRAFT)/ARQUAD T-50 BLENDS

FIGURE 2
LOGS OF CRITICAL MICELLE CONCENTRATIONS FOR $MD^*_{1.0}M$ (10% ACRYLIC ACID GRAFT)/ SODIUM DODECYL SULFATE

FIGURE 4

MIXED MONOLAYER CONCENTRATIONS TO ACHIEVE SURFACE TENSION OF 40 mN/M FOR $MD^*_{1.0}M$ (10% ACRYLIC ACID GRAFT)/SODIUM DODECYL SULFATE

SURFACTANT COMPOSITIONS

FIELD

This application relates to surfactants, and more particularly, to combinations of organic surfactants and carboxylated siloxane-polyoxyalkylene copolymers which exhibit synergistic surfactant properties.

BACKGROUND

A surfactant has been defined as a solute which, when dissolved in a designated liquid, will alter the surface or interfacial characteristics of the solution in some manner, such as lowering the surface tension.

Surfactants have utility, for example, as detergents, emulsifiers, foamers, wetting agents, dispersants, flocculants and penetrants. They are particularly useful in producing detergent foams of high stability and high foaming power in aqueous systems. Other specific uses include foam stabilization and emulsification of water-organic solvent mixtures.

Synergystic interactions between surfactants, defined rigorously below, occur when two surfactants used in concert provide unexpected surface characteristics beyond those which would be predicted based on the sum of the surface properties of the individual components. Synergystic surfactant mixtures not only have the areas of utility as described above for single surfactants, but also have the added advantage of being able to effect these utilities at lower concentrations. This advantage may be exploited in a variety of ways such as the improved economics of using less material to achieve the same performance, or by extending the effective lifetime of a surfactant solution at a given concentration.

U.S. Pat. No. 3,562,786 of Bailey, et al., first suggested using organosilicone-oxyalkylene block copolymers in combination with organic surfactants to improve the properties of the water soluble organic surfactants for use in aqueous systems. This patent does not deal with the carboxyl group-containing siloxane-polyoxyalkylene copolymers which are the subject of this application, and does not indicate that the disclosed compositions exhibit synergism.

U.S. Pat. No. 4,784,799 of Petroff discloses surfactant compositions comprising a silicone sulfobetaine surfactant and an alkylbenzenesulfonate anionic surfactant, and states that these exhibit synergism. The experimental data presented in this patent show surface tensions produced by 0.1% levels of blends of 2 surfactants, and surface tensions produced by various levels of each surfactant separately, the concentration in each case being that of the particular surfactant in the surfactant blend. Synergism is traditionally expressed as the whole being greater than the sum of the parts. Somewhat more rigorously, it can be defined as two or more agents operating together to cause an effect which is greater than that which would have been expected based on the sum of the effects of the agents operating separately. Petroff provides no indication of the surface tensions which would have been expected based on the sum of the effects of the several surfactants operating separately. He merely showed that each surfactant, considered separately at the level employed for the particular material in the surfactant blend, produced a surface tension higher than that of the corresponding blend of surfactants containing the given level of the surfactant under consideration. Thus, this reference does not describe synergystic surface tension lowering behavior, or suggest a method of achieving synergystic interactions between any silicone surfactants and anionic surfactants.

Rosen has published on "Molecular Interaction and Synergism in Binary Mixtures of Surfactants", setting forth theoretical and test protocols for ascertaining when synergism exists in mixtures of surfactants. See M. J. Rosen, Phenomena in Mixed Surfactant Systems, (J. F. Scamehorn, Ed.), ACS Symp. Ser., Vol. 311, p. 144 (1986).

Synergism in mixed micelle formation is defined by Rosen as being present when the critical micelle concentration of any mixture is lower than that of either pure surfactant. To treat this concept mathematically, a mixed micelle parameter, $B^m$, is derived which expresses the extent of interaction between two given surfactants in a solution. Thus, according to Rosen:

$$\beta^m = \frac{\ln(\alpha C_{12}^m / X^m C_1^m)}{(1 - X^m)^2}$$

where $C^m{}_{12}$ is the critical micelle concentration for the mixture;

$C^m{}_1$ is the critical micelle concentration of surfactant 1;

$\alpha$ is the weight fraction of surfactant 1 in the initial surfactant solution; and $X^m$ is the weight fraction of surfactant 1 in the surfactant of the mixed micelle.

The value of $X^m$ is derived from the iterative solution to the equation $$\frac{(X^m)^2 \ln (\alpha C_{12}^m / X^m C_1^m)}{(1 - X^m)^2 \ln ((1 - \alpha) C_{12}^m / (1 - X^m) C_2^m)} = 1$$

where $C^m{}_2$ is the critical micelle concentration of surfactant 2.

With these mathematical relationships established, synergism in mixed micelle formation is defined mathematically as existing when $\beta^m$ is negative, and $|\ln(c^m{}_1/c^m{}_2)| < |\beta^m|$.

Similarly, synergism in surface tension reduction efficiency is defined by Rosen as being present when a given surface tension can be attained at a total mixed surfactant concentration lower than that required of either surfactant by itself. To treat this concept mathematically, a parameter $\beta^\sigma$ is derived which expresses the extent of the interaction between the two given surfactants in a solution. Thus, according to Rosen:

$$\beta^\sigma = \frac{\ln(\alpha C_{12}^\sigma / X^\sigma C_1^\sigma)}{(1 - X^\sigma)^2}$$

where $C^\sigma{}_{12}$ is the concentration of the mixture required to achieve a specific surface tension;

$C^\sigma{}_1$ is the concentration of surfactant 1 required to achieve a specific surface tension;

$\alpha$ is the weight fraction of surfactant 1 in the initial surfactant solution; and $X^\sigma$ is the weight fraction of surfactant 1 in the surfactant in the mixed monolayer.

The value of $X^\sigma$ is derived from the iterative solution to the equation $$\frac{(X^\sigma)^2 \ln (\alpha C_{12}^\sigma / X^\sigma C_1^\sigma)}{(1 - X^\sigma)^2 \ln ((1 - \alpha) C_{12}^\sigma / (1 - X^\sigma) C_2^\sigma)} = 1$$

where $C^\sigma_2$ is the concentration of surfactant 2 required to achieve a specific surface tension.

With these mathematical relationships established, synergism in mixed monolayer formation is defined mathematically as existing when $\beta^\sigma$ is negative, and $|\ln(C^\sigma_1/c^\sigma_2)| < |\beta^\sigma|$.

It is always desirable to have new surfactant compositions which afford unexpectedly good surfactant properties, for the reasons discussed above. Such compositions are the subject of the present application.

SUMMARY

This invention addresses the above-identified needs and provides surfactant compositions which afford unexpectedly good surfactant properties.

The surfactant compositions which are the subject of this application are compositions of matter which comprise an organic surfactant and a carboxyl-containing polysiloxane-polyoxyalkylene copolymer. A method for modifying the surface properties of an aqueous system comprises employing as components of the system an organic surfactant and a carboxyl-containing polysiloxane-polyoxyalkylene copolymer. The addition of the acid functional groups provides a silicone-polyether copolymer which not only has surfactant properties, but which also synergistically interacts with anionic and cationic organic surfactants to provide reduction of surface tension to lower than expected values, lowering of critical micelle concentration and other desirable surface or interfacial properties.

DESCRIPTION OF THE DRAWING

The invention will be more fully understood from a consideration of the following detailed description, together with the drawing, in which.

DETAILED DESCRIPTION

In the present invention, polysiloxane-polyoxyalkylene copolymers functionalized with carboxylic acids, or salts of carboxylic acids, have shown synergistic interactions in mixed micelle formation with both cationic and anionic organic surfactants. The mixtures have been shown to form micelles at lower concentrations than those required by either of the components. Further, calculations of the mixed micelle parameter $(\beta^m)$ and comparison with the component critical micelle concentrations $|\beta^m| > |\ln(C^m_1/C^m_2)|$ demonstrate that these mixtures fit the mathematical definition for synergistic interactions in the formation of mixed micelles.

In addition, these carboxyl group-containing polysiloxane-polyoxyalkylene copolymers have shown synergistic interactions in surface tension reduction efficiency with both cationic and anionic organic surfactants. The mixtures have been shown to reduce the surface tension to a specific value (40 mN/m), at lower concentrations than those required by either of the components. Further, calculations of the mixed monolayer parameter and comparison with the component mixed monolayer concentrations $|\beta^\sigma| > |\ln(C^\sigma_1/C^\sigma_2)|$ demonstrate that these mixtures fit the mathematical definition for synergistic interactions in the mixed monolayer.

The organic surfactant employed in the surfactant compositions of the invention are cationic or anionic surfactants, which are well known in the art and are commercially available. These organic surfactants are generally considered as comprising hydrophilic and hydrophobic functional groups.

The anionic organic surfactants can contain, for example, hydrophilic groups such as phosphates, sulfosuccinates, carboxylates, sulfates and sulfonates, and hydrophobic groups such as alkyl, aromatic, and arylalkyl hydrocarbons. The specific anionic organic surfactant demonstrated in this application is sodium dodecylsulfate, which will be discussed below.

The cationic organic surfactants can contain, for example, hydrophilic groups such as quaternary amine salts of chlorides, sulfates, sulfonates, and carboxylates, and hydrophobic groups such as alkyl, aromatic, and arylalkyl hydrocarbons. The specific cationic organic surfactant demonstrated in this application is trimethyltallowammonium chloride, which will be discussed below.

The carboxyl-containing polysiloxane-polyoxyalkylene copolymers employed in the surfactant compositions of the invention are materials having the average general formula $$R_aR'_{3-a}SiO(Me_2SiO)_b(MeRSiO)_cSiR_aR'_{3-a}$$

wherein R' stands for an alkyl group of 1-3 carbon atoms; and R stands for —$(C_dH_{2d}O)(C_eH_{2e}O)_i(R''C_fH_{2f-1}O)_jR'''$;

wherein

R'' stands for —$(C_gH_{2g-h}(CO_2Q)_h)_yH$; and

R''' stands for H, an alkyl group of 1-4 carbon atoms, an acyl group of 1-4 carbon atoms, or R'';

a is an integer 0-2;

b is 0-20;

c is 0-10;

the sum of a and c is 0.1-10;

d is an integer 1-4;

e is 2 or 3 for each unit $(C_eH_{2e}O)$;

f is 2 or 3 for each unit $(R''C_fH_{2f-1}O)$;

g is 1-8;

h is 1-4;

y is 1-5;

the sum of i and j is 1-25;

j is 0.1-5; and

Q is a cation selected from the group consisting of H+, alkali metal ions, and quaternary ammonium salts.

The group R is a polyoxyalkylene chain which includes, on average, 0.1 to 5 carboxyl-containing moieties R'' and may be capped or uncapped. The subscript y represents the number of acid-containing monomer units. The polyoxyalkylene chain may be made up of ethyleneoxy groups, propyleneoxy groups, or both.

The group R' is preferably methyl. The subscript "a" is preferably 0–1, and most preferably 0. The subscript "b" is preferably 0–10, and most preferably 0–5. The subscript "c" is preferably 0.5–5, and most preferably 1–3. The subscript "d" is preferably 3. The subscript "g" is preferably 2–5, and most preferably 2–3. The subscript "h" is preferably 1–3, and most preferably 1–2. The subscript "y" is preferably 1–3, and most preferably 1. The group R''' is preferably an alkyl or acyl group of 1–4 carbon atoms, and most preferably an alkyl group. The sum of subscripts "i" and "j" is preferably 1–20 and most preferably 1–10. The subscript "j" is preferably 1–2, and most preferably 1.

The carboxyl-containing polysiloxane-polyoxyalkylene copolymers used in this invention may be prepared by introducing carboxylic acid-containing moieties into the polyether chains of a siloxane-polyoxyalkylene copolymer in any of the ways known to the art.

Procedures for synthesizing nonhydrolyzable silicone surfactants having polyalkylene oxide pendant groups are well known. Representative disclosures are provided in U.S. Pat. Nos. 3,741,917; 4,147,847; and 4,855,379, relevant portions of which are hereby incorporated by reference.

The desired polysiloxane starting material may be prepared by causing a polyhydridosiloxane of generalized average formula $M^{}D_xD'_yM^{}$ to react with allyl-started oxyalkylene polymer in the conventional manner, typically by means of a platinum catalyzed hydrosilylation of the unsaturated polyoxyalkylene with a polydialkylsiloxane having SiH units, as taught by U.S. Pat. No. 4,031,044 for instance.

In the formula for the polyhydridosiloxane, $M^{**}$ is $(CH_3)_2(H)SiO_{1/2}$ or $(CH_3)_3SiO_{1/2}$, D is $(CH_3)_2SiO_{2/2}$, and D' represents $(CH_3)(H)SiO_{2/2}$. The allyl-started oxyalkylene polymers are polyethers having a terminal vinyl group, which may optionally be 2-substituted, and containing multiple units derived from ethylene oxide, propylene oxide, or both. The reagents are mixed, generally in a solvent such as toluene or dipropylene glycol, heated to about 70°–85° C., then the catalyst is added, a temperature rise of about 10°–15° C. is observed, and the mixture is finally sampled and analyzed for SiH groups by adding an alcohol and base and measuring evolved hydrogen. If a volatile solvent was used, this is removed under vacuum, and the mixture is generally neutralized with a weak base such as $NaHCO_3$, then filtered.

The polyhydridosiloxanes of generalized average formula $M^{}D_xD'_yM^{}$ are prepared in the manner known to the art. For the case in which $M^{}$ is $(CH_3)_3SiO_{1/2}$, an alkyldisiloxane such as hexamethyldisiloxane, a polyhydridosiloxane polymer, and an alkyl cyclosiloxane such as octamethylcyclotetrasiloxane are reacted in the presence of a strong acid such as sulfuric acid. For the case in which $M^{}$ is $(H)(CH_3)_2SiO_{2/2}$, a hydridoalkyldisiloxane such as dihydridotetramethyldisiloxane, a polyhydridosiloxane polymer, and an alkyl cyclosiloxane such as octamethylcyclotetrasiloxane are reacted in the presence of a strong acid such as sulfuric acid.

The desired unsaturated polyoxyalkylene starting materials are likewise prepared in the manner known to the art, by reacting an unsaturated alcohol starter with a strong base to make an alkoxide, which is subsequently reacted with with ethylene oxide, propylene oxide, or both, and ultimately capped as taught by U.S. Pat. Nos. 2,425,755; 2,448,664; and 3,507,923. The capping involves further reaction of the initially formed terminal hydroxyl group with an alkylating or acylating agent such as a methyl halide or acetic anhydride, respectively. Other end caps may of course be employed.

The carboxylic acid functional groups may be introduced into the intermediate siloxane-polyoxyalkylene copolymer using any of several known methods. The method used in this application is taught in U.S. Pat. No. 3,418,354 and involved slowly and simultaneously adding (a) an olefin and (b) a peroxide containing a peroxide group linked to a tertiary carbon atom to (c) a polyoxyalkylene compound which was maintained at a temperature sufficiently elevated to cause a graft copolymer of the olefin and the polyoxyalkylene compound to be produced. Using this method, unsaturated carboxylic acids were attached to the above prepared siloxane-polyoxyalkylene copolymers. Alternative methods include such methods as selective oxidation of the terminal alcohol on the polyether chain as describe in the British patent 807,666 or U.S. Pat. No. 4,256,916, or addition to unsaturated acids or nitriles as described in U.S. Pat. No. 3,544,615 followed by conversion to the desired form.

The compositions of the invention can be prepared in various ways. The organic surfactant and the carboxylated siloxane-polyoxyalkylene copolymer can be mixed. Alternatively, one of these materials can be mixed with water and then the resulting mixture combined with the other ingredient. Similarly, one of these materials could be mixed with some third material with which the ultimate surfactant composition is to be used and then the other of these materials combined with the resulting mixture. The skilled in the art will appreciate that there are other modes of combination.

The organic surfactant and the carboxylated siloxane may be employed in any ratio which provides a mixture suitable for one's purpose. The weight ratio of organic surfactant to carboxylated siloxane-polyoxyalkylene copolymer is generally from about 95:5 to 5:95, preferably from 90:10 to 50:50, and most preferably from 90:10 to 70:30.

The surfactant compositions of the invention have typical surfactant applications, namely, as detergents, emulsifiers, foamers, wetting agents, dispersants, flocculants, penetrants, etc. In aqueous solutions they are generally employed at a level of 0.001 to 10 percent by weight, preferably 0.01 to 5 percent, based on the total weight of the aqueous solution.

GLOSSARY

LUPERSOL ® 101 is a free radical-generating catalyst, 2,5-dimethyl-2,5-di(t-butylperoxy)hexane, and is available from Pennwalt Corporation.

ARQUAD ® T-50 is a cationic surfactant, trimethyltallowammonium chloride, and is available from Akzo Chemicals.

M stands for $(CH_3)_3SiO_{1/2}$.
D stands for $(CH_3)_2SiO_{2/2}$.
D' stands for $(CH_3)(H)SiO_{2/2}$.
D* stands for $(CH_3)(polyether)SiO_{2/2}$.

EXPERIMENTAL

The invention will be further clarified by a consideration of the following examples, which are intended to be purely exemplary and not a limitation of the invention.

Surface tension measurements were made using the Wilhelmy Plate method. A sand blasted platinum blade was used as a sensor. All measurements were made at 25° C. Deionized water further treated with a Millipore filtration system was used to prepare $5 \times 10^{-3}$M sodium chloride which was then used to prepare all surfactant solutions. Surface tension results are given in units of milliNewtons per meter (mN/m).

Critical micelle concentrations were determined in the normal way, by plotting surface tensions versus concentrations and noting the change in slope.

EXAMPLE 1

This example shows the preparation and surface tension properties of neutralized acrylic acid grafted siloxane polyether copolymers.

150 gms of $Me_3SiOMeRSiOSiMe_3$ ($MD^*_{1.0}M$), where R is $(CH_2)_3O(CH_2CH_2O)_{6.5}Me$, was placed in a 500 ml flask and heated to 160° C. 2.2 gms of LUPERSOL ® 101 free radical catalyst was added very slowly. After allowing for a short initiation time, 7.5 gms of acrylic acid was added slowly in concert with LUPERSOL ® 101 catalyst. When the addition of the two components was complete, the solution was allowed to stir under heating for an additional 30 minutes, and then allowed to cool.

Samples taken for surface measurements were adjusted to pH 7.0 by titrating with 1.0N NaOH.

Table 1 shows the structure and surface properties for siloxane polyether copolymers functionalized and neutralized in the manner described above.

TABLE 1

| Siloxane/ polyether | Surface Properties for Acrylic Acid Functionalized Siloxane polyether Copolymers (pH = 7) | | | | |
|---|---|---|---|---|---|
| | Acrylic Acid Grafting (%) | CMC (wt %) | Log CMC | $[\gamma 40]^c$ | Log $[\gamma 40]^c$ |
| $MD^*_{1.0}M^a$ | 5.0 | $2.5 \times 10^{-2}$ | −1.60 | $4.1 \times 10^{-4}$ | −3.39 |
| $MD^*_{1.0}M^a$ | 10.0 | $1.05 \times 10^{-1}$ | −0.98 | $5.6 \times 10^{-3}$ | −2.25 |
| $MD^*_{1.5}M^a$ | 10.0 | $1.4 \times 10^{-2}$ | −1.85 | $1.2 \times 10^{-3}$ | −2.92 |
| $MD_{13}D^*_{5.5}M^b$ | 10.0 | $3.0 \times 10^{-2}$ | −1.52 | $5.6 \times 10^{-3}$ | −2.25 |

Footnotes for Table 1:
$^a$D* is $Me(O)Si(CH_2)_3O(CH_2CH_2O)_{6.5}Me$.
$^b$D* is $Me(O)Si(CH_2)_3O(CH_2CH_2O)_{11.2}H$.
$^c$concentration that gives surface tension of 40 mN/m.
$^d$Log concentration that gives surface tension of 40 mN/m.

EXAMPLE 2

Example 2 shows the preparation and surface tension properties for a siloxane polyether copolymer functionalized with a dicarboxylic acid and neutralized to pH 7.0.

200 gms of $Me_3SiOMeRSiOSiM_3$ ($MD^*_{1.0}M$), where R is $(CH_2)_3O(CH_2CH_2O)_{6.5}OMe$, was placed in a 500 ml flask and heated to 160° C. 3.3 gms of LUPERSOL ® 101 free radical catalyst was added very slowly. After a short initiation time, 80 gms of a solution made from 20 gms of itaconic acid and 60 gms of methanol was slowly added in concert with the LUPERSOL ® 101 catalyst. After the addition was completed, the solution was heated for an additional 30 minutes and then cooled. A sample was take from this product and adjusted to pH 7.0 with 1N NaOH. The sample was then used for the surface tension measurements.

Table 2 shows the results for the itaconic acid grafted siloxane polyether copolymer.

TABLE 2

| Siloxane/ polyether | Surface Properties of Itaconic Functionalized Siloxane polyether Copolymers (pH = 7) | | | | |
|---|---|---|---|---|---|
| | Itaconic Acid Grafting (%) | CMC (wt %) | Log CMC | $[\gamma 40]^b$ | Log $[\gamma 40]^c$ |
| $MD^*_{1.0}M^a$ | 10.0 | $6.4 \times 10^{-3}$ | −2.19 | $5. \times 10^{-4}$ | −3.24 |

Footnotes for Table 2:
$^a$D* is $Me(O)Si(CH_2)_3O(CH_2CH_2O)_{6.5}OMe$.
$^b$concentration that gives surface tension of 40 mN/m.
$^c$log concentration that gives surface tension of 40 mN/m.

EXAMPLE 3

Example 3 demonstrates the favorable synergistic interaction in mixed micelle formation for anionic functionalized siloxane polyether copolymers with ARQUAD ® T-50 cationic organic surfactant.

Table 3 shows the results of blending ARQUAD ® T-50 cationic surfactant with several different neutralized, acid grafted siloxanepolyethers prepared above. The first set of data is for the ARQUAD ® T-50 cationic surfactant with no added cosurfactant. The remainder of the table lists the Log CMC's and mixed micelle parameter values for several ARQUAD ® T-50 cationic surfactant/neutralized, carboxylic acid grafted siloxane polyether copolymers. A comparison of each mixed surfactant and its components (listed in Table 1, 2 or 3), shows that the value of the experimental CMC is lower for the mixed surfactant than for the components. Further, since $\beta^m$ is negative for each mixture, and $|\beta^m|$ is $> |\ln(C^m_1/C^m_2)|$, the neutralized, carboxylic acid grafted siloxane polyether copolymers fit the mathematical definition of Rosen, discussed above, for having a synergistic mixed micelle interaction with the cationic organic surfactant.

Figure 1:
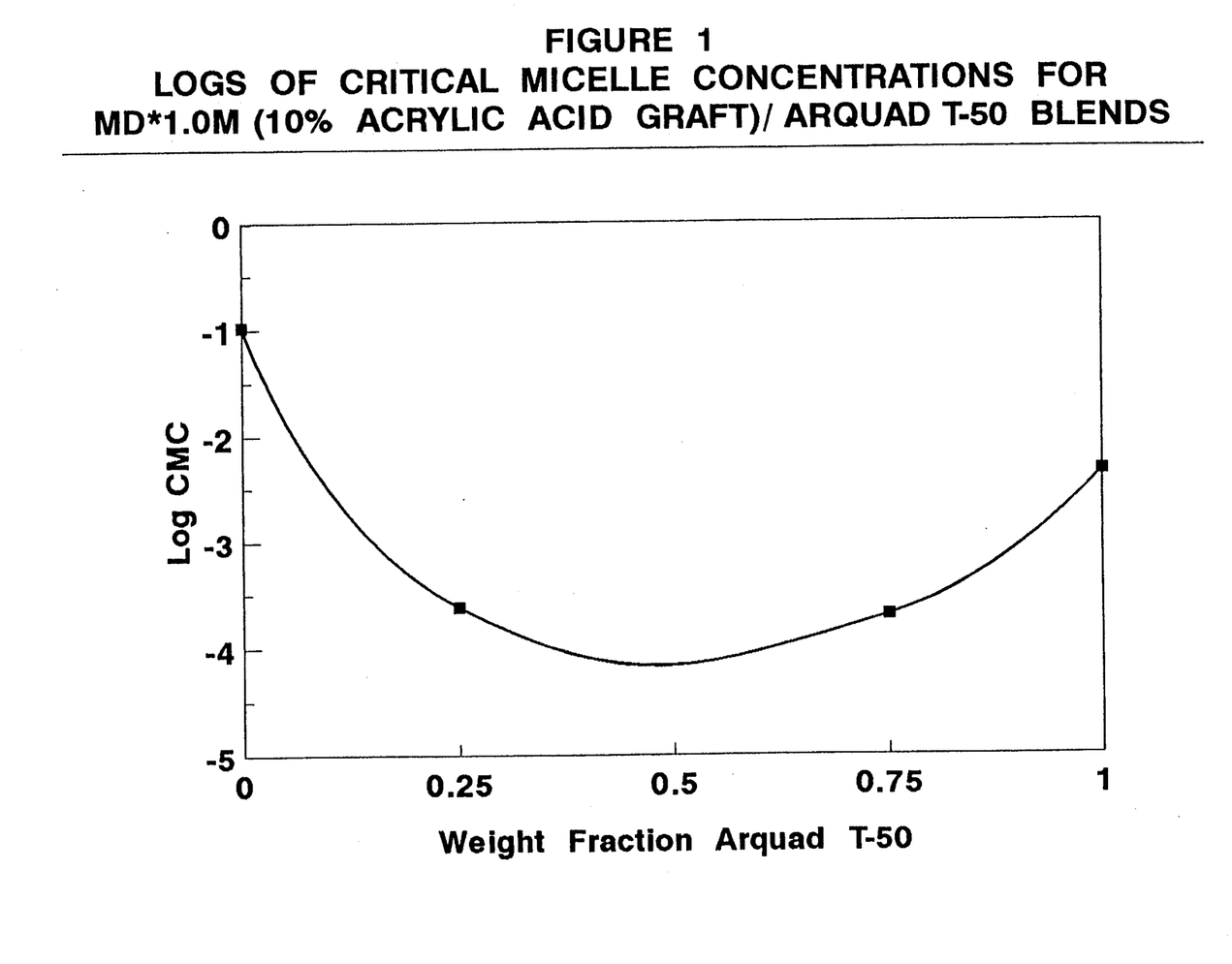
FIG. 1 is a plot of log CMC vs. weight fraction of ARQUAD ® T-50 cationic surfactant in blends with an acid-grafted siloxane-polyoxyalkylene copolymer.

FIG. 1 graphically illustrates the above synergistic interaction for 10% acrylic acid grafted $MD^*_{1.0}M$ where D is $(CH_2)_3O(CH_2CH_2O)_{6.5}OMe$. A straight line between the Log CMC's of the component surfactants represents what would be expected for an ideal mixing of the two. A horizontal line at the level of the lowest Log CMC for the individual components indicates the limit of the target range for true synergistic interactions. Points below this line lie in the region of synergistic interaction. As seen in the FIG. 1, the interaction of 10% acrylic acid grafted $MD^*_{1.0}M$ with ARQUAD ® T-50 cationic surfactant is clearly in the synergistic region for most of the tested blends.

TABLE 3

Synergistic Mixed Micelle Interactions
Anionic Siloxanes/Cationic Organic Surfactant (ARQUAD ® T-50)

| Cosurfactant[a, b] | Weight Fraction Siloxane | Log[a] CMC | $\beta^m$ | $|\ln(C^m_1/C^m_2)|$ |
|---|---|---|---|---|
| ARQUAD ® T-50 | | −2.34 | | |
| 5% AA/-MD*$_{1.0}$M | 0.50 | −2.51 | −4.53 | 1.69 |
| 10% AA-MD*$_{1.0}$M | 0.25 | −3.62 | −18.5 | 3.10 |
| 10% AA-MD*$_{1.0}$M | 0.75 | −3.70 | −18.5 | 3.10 |
| 10% AA-MD*$_{1.5}$M | 0.50 | −2.74 | −5.82 | 1.11 |
| 10% AA-MD$_{13.5}$M*$_{5.5}$M | 0.50 | −2.96 | −9.15 | 1.88 |
| 10% IA-MD*$_{1.0}$M | 0.50 | −2.68 | −3.78 | 0.33 |

Footnotes for Table 3:
[a]% AA indicates the amount of acrylic acid grafted onto the siloxane polyether copolymer.
[b]% IA indicates the amount of itaconic acid grafted onto the siloxane polyether copolymer.

EXAMPLE 4

Example 4 demonstrates the synergistic mixed micelle interaction for an carboxy functionalized siloxane-polyoxyalkylene copolymer and the anionic organic surfactant sodium dodecylsulfate. Table 4 shows the CMC measurements for mixtures of the cationic organic surfactant sodium dodecylsulfate with several neutralized, acid grafted siloxane polyether copolymers. The first row of data is for sodium dodecylsulfate for comparison purposes. The remainder of Table 4 shows the CMC and mixed micelle parameter values for several surfactant mixtures. A comparison of each mixed surfactant and its components (listed in Table 1 or 4), shows that the value of the experimental CMC is lower for the mixed surfactant than for the components. Further, since $\beta^m$ is negative for each mixture, and $|\beta^m|$ is $> |\ln(C^m_1/C^m_2)|$, the neutralized, carboxylic acid grafted siloxane polyether copolymers fit the mathematical definition of Rosen, discussed above, for having a synergistic mixed micelle interaction with the anionic organic surfactant.

Figure 2:
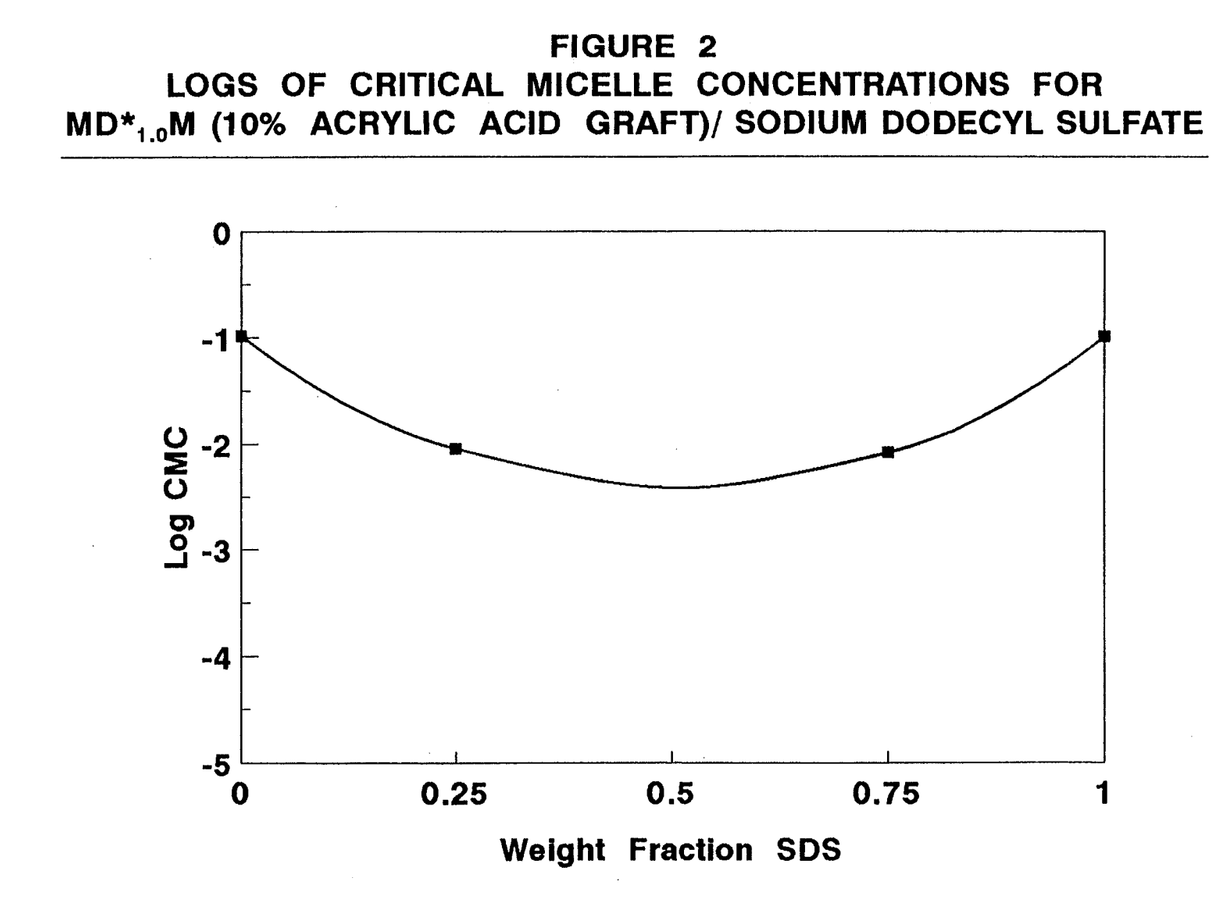
FIG. 2 is a plot of log CMC vs. weight fraction of the anionic surfactant sodium dodecyl sulfate in blends with an acid-grafted siloxane-polyoxyalkylene copolymer.

FIG. 2 graphically illustrates the above synergistic interaction for 10% acrylic acid grafted MD*$_{1.0}$M where D is $(CH_2)_3O(CH_2CH_2O)_{6.5}OMe$. A line between the Log CMC's of the component surfactants represents what would be expected for an ideal mixing of the two. A line at the level of the lowest Log CMC for the individual components indicates the limit of the target range for true synergistic interactions. Points below this line lie in the region of synergistic interaction. As seen in the FIG. 2, the interaction of 10% acrylic acid grafted MD*$_{1.0}$M with sodium dodecylsulfate is clearly in the synergistic region.

TABLE 4

Synergistic Mixed Micelle Interactions
Anionic Siloxanes/Anionic Organic Surfactant (SDS)

| Cosurfactant[a] | Weight Fraction Silicone | Log CMC | $\beta^m$ | $|\ln(C^m_1/C^m_2)|$ |
|---|---|---|---|---|
| sodium dodecyl sulfate | | −0.99 | | |
| 5% AA-MD*$_{1.0}$M | 0.50 | −2.10 | −7.17 | 1.42 |
| 10% AA-MD*$_{1.0}$M | 0.25 | −2.08 | −10.5 | 0.02 |
| 10% AA-MD*$_{1.0}$M | 0.75 | −2.04 | −10.3 | 0.02 |
| 10% AA-MD*$_{1.5}$M | 0.50 | −2.47 | −9.31 | 2.00 |

Footnote for Table 4:
[a]% AA indicates the amount of acrylic acid grafted onto the siloxane polyether copolymer.

EXAMPLE 5

Example 5 demonstrates the favorable synergistic interaction in surface tension reduction efficiency for anionic functionalized siloxane polyether copolymers with ARQUAD ® t-50 cationic organic surfactant.

Table 5 shows the results of blending ARQUAD ® T-50 cationic surfactant with several different neutralized, acid grafted siloxanepolyethers prepared above. The first set of data is for the ARQUAD ® T-50 cationic surfactant with no added cosurfactant. The remainder of the table lists the Log [γ40] and mixed monolayer parameter values for several ARQUAD ® T-50 cationic surfactant/neutralized, carboxylic acid grafted siloxane polyether copolymer mixtures. A comparison of each mixed surfactant and its components (listed in Table 1, 2 or 5), shows that the concentration of the mixed surfactant required to attain a surface tension of 40 mN/m is lower for the mixed surfactant than for the components. Further, since $\beta^\sigma$ is negative for each mixture, and $|\beta^\sigma|$ is $> |\ln(C^\sigma_1/C^\sigma_2)|$, the neutralized, carboxylic acid grafted siloxane polyether copolymers fit the mathematical definition of Rosen, discussed above, for interactions at the mixed monolayer with the cationic organic surfactant.

In some cases (for example 50/50 10% AA-MD*$_{13.5}$D*$_{5.5}$M/ARQUAD ® T-50 cationic surfactant), the concentration required by the experimental mixture is only slightly less than for one component (ARQUAD ® T-50 cationic surfactant). However, this is the result of arbitrarily picking a particular blend ratio for experimental measurements, the mathematics predict that at an optimum blend ratio the required concentration will be lower than for either component alone. Thus for the example cited, $\beta^\sigma$ is appropriately negative and $|\beta^\sigma|$ is clearly $> |\ln(C^\sigma_1/C^\sigma_2)|$.

Figure 3:
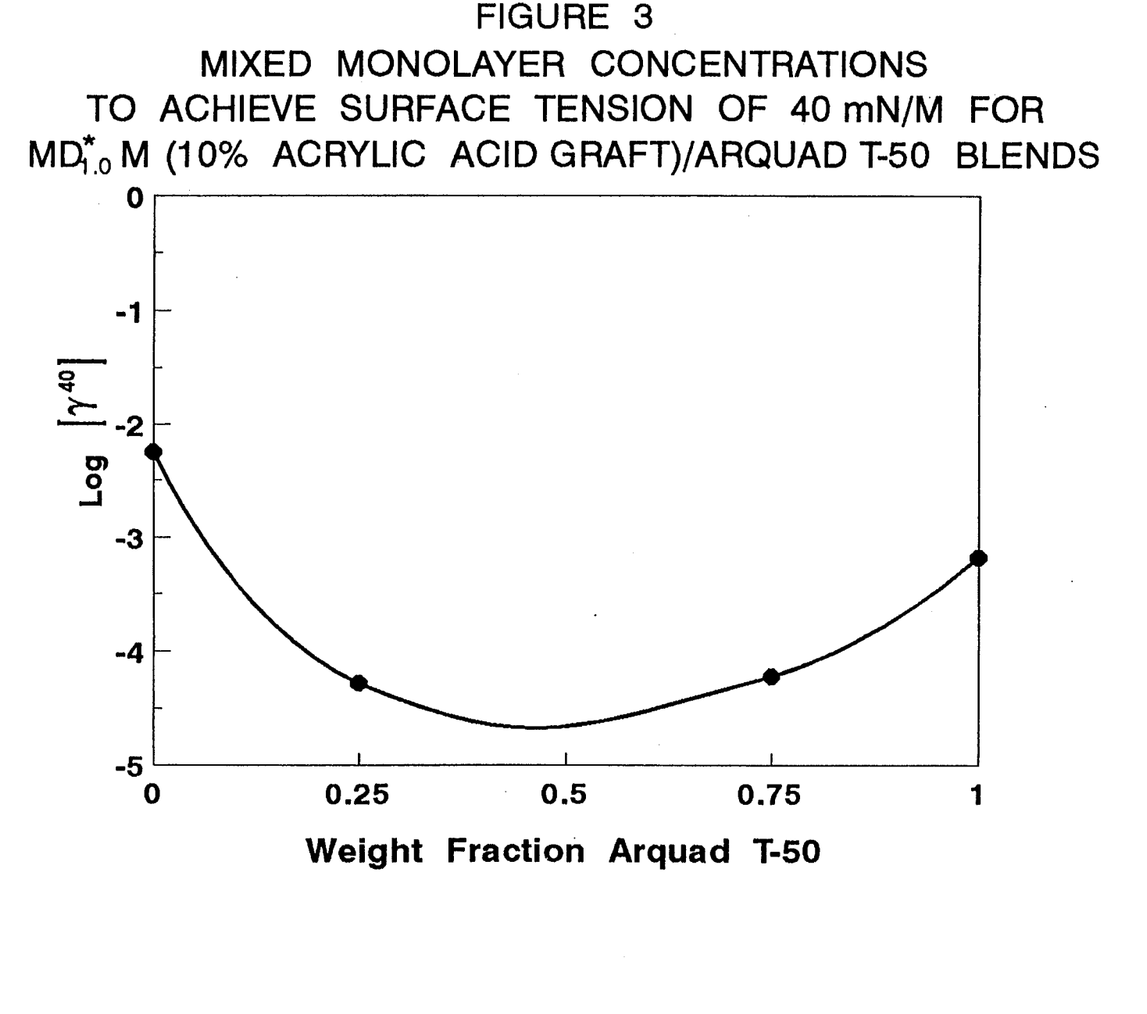
FIG. 3 is a plot of log $[\gamma^{40}]$ vs. weight fraction of ARQUAD ® T-50 cationic surfactant in blends with an acid-grafted siloxane-polyoxyalkylene copolymer.

FIG. 3 graphically illustrates the above synergistic interaction for 10% acrylic acid grafted MD*$_{1.0}$M where D* is $(CH_2)_3O(CH_2CH_2O)_{6.5}OMe$. A line between the Log [γ40]'s of the component surfactants represents what would be expected for an ideal mixing of the two. A line at the level of the lowest Log [γ40] indicates the limit of the target range for synergistic interactions. Points below this line lie in the region of synergistic interaction. As seen in the FIG. 3, the interaction of 10% acrylic acid grafted MD*1.0M with Arquad T-50 is clearly in the synergistic region for most of the blends.

TABLE 5

Synergistic Surface Tension Reduction Efficiency
Anionic Siloxanes/Cationic Organic Surfactant (ARQUAD ® T-50)

| Cosurfactant | Weight Fraction Siloxane | Log$^a$ [γ40] | $\beta^\sigma$ | $|\ln((C^\sigma_1/C^\sigma_2)|$ |
|---|---|---|---|---|
| ARQUAD ® T-50 | | −3.18 | | |
| 5% AA/-MD*$_{1.0}$M | 0.50 | −3.46 | −1.52 | 0.48 |
| 10% AA-MD*$_{1.0}$M | 0.25 | −4.22 | −14.4 | 2.20 |
| 10% AA-MD*$_{1.0}$M | 0.75 | −4.28 | −14.3 | 2.20 |
| 10% AA-MD*$_{1.5}$M | 0.50 | −3.43 | −3.47 | 0.60 |
| 10% AA-MD$_{13.5}$D*$_{5.5}$M | 0.50 | −3.19 | −3.59 | 2.14 |
| 10% IA-MD*$_{1.0}$M | 0.50 | −3.35 | −1.23 | 0.15 |

Footnote for Table 5:
$^a$Log concentration that gives surface tension of 40 mN/m.

EXAMPLE 6

Example 6 demonstrates the favorable synergistic interaction in surface tension reduction efficiency for anionic functionalized siloxane polyether copolymers with an anionic organic surfactant (sodium dodecylsulfate).

Table 6 shows the results of blending sodium dodecylsulfate with several different neutralized, acid grafted siloxanepolyethers prepared above. The first set of data is for the sodium dodecylsulfate (SDS) with no added cosurfactant. The remainder of the table lists the Log [γ40] and mixed monolayer parameter values for several SDS/neutralized, carboxylic acid grafted siloxane polyether copolymer mixtures. A comparison of each mixed surfactant and its components (listed in Table 1 or 6), shows that the concentration of the mixed surfactant required to attain a surface tension of 40 mN/m is lower for the mixed surfactant than for the components. Further, since $\beta^\sigma$ is negative for each mixture, and $|\beta^\sigma|$ is $> |\ln(C^\sigma_1/C^\sigma_2)|$, the neutralized, carboxylic acid grafted siloxane polyether copolymers fit the mathematical definition of Rosen, discussed above, for having a synergistic mixed micelle interaction with the cationic organic surfactant.

In some cases (for example 50/50 10% AA-MD*$_{1.0}$M/SDS), the concentration required by the experimental mixture is about the same as one of the components (10% AA-MD*$_{1.0}$M). However, this is the result of arbitrarily picking a particular blend ratio for experimental measurements, the mathematics predict that at an optimum blend ratio the required concentration will be lower than for either component alone. Thus for the example cited, $\beta^\sigma$ is appropriately negative and $|\beta^\sigma|$ is clearly $> |\ln(C^\sigma_1/C^\sigma_2)|$.

Figure 4:
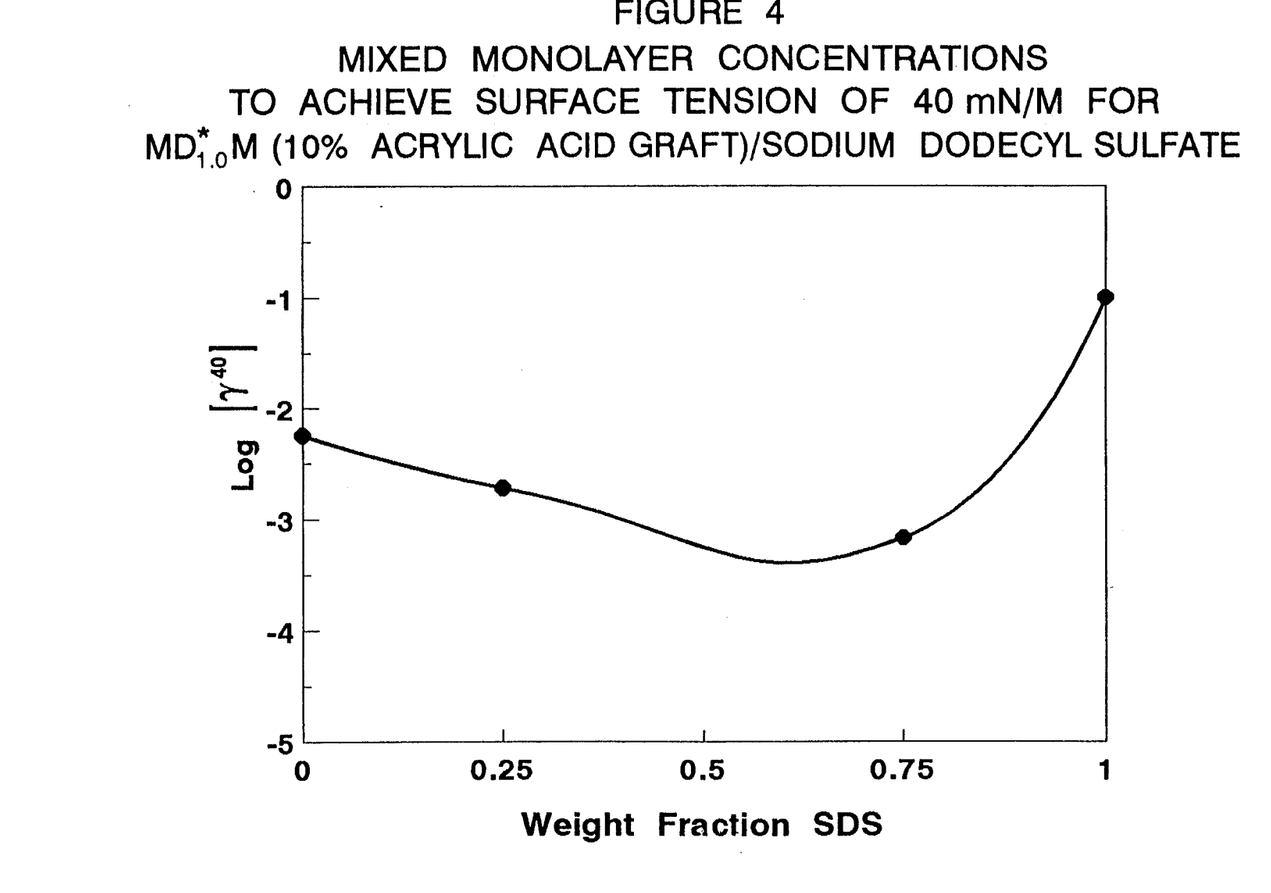
FIG. 4 is a plot of log $[\gamma^{40}]$ vs. weight fraction of the anionic surfactant sodium dodecyl sulfate in blends with an acid-grafted siloxane-polyoxyalkylene copolymer.

FIG. 4 graphically illustrates the above synergistic interaction for 10% acrylic acid grafted MD*$_{1.0}$M where D* is $(CH_2)_3O(CH_2CH_2O)_{6.5}OMe$. A line between the Log [γ40] of the component surfactants represents what would be expected for an ideal mixing of the two. A line at the level of the lowest Log [γ40] indicates the limit of the target range for true synergistic interactions. Points below this line lie in the region of synergistic interaction. As seen in the FIG. 4, the interaction of 10% acrylic acid grafted with SDS is clearly in the synergistic region.

TABLE 6

Synergistic Surface Tension Reduction Efficiency
Anionic Siloxanes/Anionic Organic Surfactant (SDS)

| Cosurfactant | Weight Fraction Siloxane | Log$^a$ [γ40] | $\beta^\sigma$ | $|\ln((C^\sigma_1/C^\sigma_2)|$ |
|---|---|---|---|---|
| Sodium dodecyl-sulfate | | −1.0 | | |
| 10% AA-MD*$_{1.0}$M | 0.25 | −3.17 | −10.4 | 2.9 |
| 10% AA-MD*$_{1.0}$M | 0.75 | −2.72 | −13.7 | 2.9 |
| 5% AA-MD*$_{1.0}$M | 0.50 | −3.00 | 0.0 | 5.0 |
| 10% AA-MD*$_{1.5}$M | 0.50 | −2.77 | −4.54 | 4.42 |

Footnote for Table 6:
$^a$Log concentration that gives surface tension of 40 mN/m.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

What is claimed is:

1. A composition comprising two different surfactants, wherein one surfactant is selected from each of the groups i and ii set forth below:
    i) from about 5 to about 95 weight percent of an organic surfactant selected from the group consisting of organic cationic surfactants and organic anionic surfactants; and
    ii) from about 95 to about 5 weight percent of a different carboxyl-containing siloxane-polyoxyalkylene copolymer surfactant having the general average formula wherein
Me stands for methyl;
R' stands for an alkyl group of 1–3 carbon atoms; and
R stands for wherein
R" stands for —$(C_gH_{2g-h}(CO_2Q)_h)_yH$; and
R''' stands for H, an alkyl group of 1–4 carbon atoms, an acyl group of 1–4 carbon atoms, or R";
a is an integer 0–2;
b is 0–20;

c is 0–10;
the sum of a and c is 0.1–10;
d is an integer 1–4;
e is 2 or 3 for each unit $(C_eH_{2e}O)$;
f is 2 or 3 for each unit $(R''C_fH_{2f-1}O)$;
g is 1–8;
h is 1–4;
y is 1–5;
the sum of i and j is 1–25;
j is 0.1–5; and
Q is a cation selected from the group consisting of $H^+$, alkali metal ions, and quaternary ammonium salts.

2. A composition of claim 1, wherein:
R' is methyl;
R''' is an alkyl or acyl group;
a=0;
b=0–10;
c=0.5–1.0;
d=3;
g=1–5;
h=1–3;
y=1–3; and
j=0.1–2.

3. A composition of claim 1, wherein:
R' is methyl;
R''' is an alkyl group;
a=0;
b=0–10;
c=0.5–1.0;
d=3;
g=2–3;
h=1–2;
y=1; and
j=1.

4. A method for modifying the surface properties of an aqueous system, comprising:
employing as a component of said system a composition comprising two different surfactants, wherein one surfactant is selected from each of the groups i and ii set forth below:
i) from about 5 to about 95 weight percent of an organic surfactant selected from the group consisting of organic cationic surfactants and organic anionic surfactants; and
ii) from about 95 to about 5 weight percent of a different carboxyl-containing siloxane-polyoxyalkylene copolymer surfactant having the general average formula $R_aR'_{3-a}SiO(Me_2SiO)_b(MeRSiO)_cSiR_aR'_{3-a}$ wherein
Me stands for methyl;
R' stands for an alkyl group of 1–3 carbon atoms; and
R stands for $—(C_dH_{2d}O)(C_eH_{2e}O)_i(R''C_fH_{2f-1}O)_jR''';$ wherein
R'' stands for $—(C_gH_{2g-h}(CO_2Q)_h)_yH$; and
R''' stands for H, an alkyl group of 1–4 carbon atoms, an acyl group of 1–4 carbon atoms, or R'';
a is an integer 0–2;
b is 0–20;
c is 0–10;
the sum of a and c is 0.1–10;
d is an integer 1–4;
e is 2 or 3 for each unit $(C_eH_{2e}O)$;
f is 2 or 3 for each unit $(R''C_fH_{2f-1}O)$;
g is 1–8;
h is 1–4;
y is 1–5;
the sum of i and j is 1–25;
j is 0.1–5; and
Q is a cation selected from the group consisting of $H^+$, alkali metal ions, and quaternary ammonium salts.

5. The method of claim 4, wherein in said siloxane-polyoxyalkylene copolymer:
R' is methyl;
R''' is an alkyl or acyl group;
a=0;
b=0–10;
c=0.5–10;
d=3;
g=1–5;
h=1–3;
y=1–3; and
j=0.1–2.

6. The method of claim 4, wherein in said siloxane-polyoxyalkylene copolymer:
R' is methyl;
R''' is an alkyl group;
a=0;
b=0–10;
c=0.5–10;
d=3;
g=2–3;
h=1–2;
y=1; and
j=1.

7. The composition of claim 1 wherein said organic anionic surfactants contain hydrophilic moieties selected from the group consisting of phosphates, sulfosuccinates, carboxylates, sulfates, and sulfonates, and said cationic surfactants contain hydrophilic moieties selected from the group consisting of quaternary amine salts.

8. The method of claim 4 wherein said organic anionic surfactants contain hydrophilic moieties selected from the group consisting of phosphates, sulfosuccinates, carboxylates, sulfates, and sulfonates, and said cationic surfactants contain hydrophilic moieties selected from the group consisting of quaternary amine salts.

* * * * *